Patented June 25, 1929.

1,718,882

UNITED STATES PATENT OFFICE.

ERWIN SCHWENK AND KARL REICHNER, OF AUSSIG, AND METHODIUS KNOB, OF FREUDENTHAL IN SCHLESIEN, CZECHOSLOVAKIA, ASSIGNORS TO VEREIN FUER CHEMISCHE UND METALLURGISCHE PRODUKTION, OF KARLSBAD, CZECHOSLOVAKIA, A COMPANY OF CZECHOSLOVAKIA.

DYEING ANIMAL FIBERS.

No Drawing. Application filed August 1, 1927, Serial No. 210,008, and in Germany January 18, 1926.

The invention relates to the production of azo-dyestuffs on animal materials such as wool, silk, hair or skin.

We have found that an aromatic organic compound which contains the grouping —$SO_2.NH$— has an affinity for animal materials which surpasses that of most other aromatic compounds, so that if the compound containing such grouping is capable of coupling with a diazo-compound to form a dyestuff, it constitutes a valuable grounding for the purpose of producing azo-dyestuffs on animal materials, and the dyestuffs produced are of excellent fastness and of beautiful tints.

Aromatic compounds containing the grouping —$SO_2.NH$— have the general formula R—$SO_2.NH$—R', in which R is an aromatic radicle of the benzene, naphthalene or other series, whether substituted or not, and R' is the same or another such radicle or hydrogen.

According to the invention an animal material, such as wool, silk, hair, or skin, is grounded with an aromatic organic compound having a composition falling within the above definition, and also capable of coupling with a diazo-compound to form an azo-dyestuff, and then developing this grounding with a suitable diazo-compound. The grounding may be conducted in presence of formaldehyde, when this is desirable.

When R or R' in the general formula is a substituted aromatic radicle, the substituent may be —$SO_2.NH_2$ or may otherwise contain the grouping —$SO_2.NH$—, so that it will be understood that a compound of the general formula may contain two or more groupings —$SO_2.NH$—.

Excellent results are obtained when R' in the general formula is an aromatic radicle having as a substituent the group —NH.CO.R", in which R" is an aromatic radicle, substituted or not, so that the compound is a sulpharylide of the general formula R—$SO_2.NH$—R'—NH.COR", R or R" or both of them being capable of coupling with a diazo-compound.

However, other sulpharylides and also sulphamides give good results and some suitable compounds will now be named in connection with examples of their application, it being understood that the invention is in no way limited to the use of the compounds named, or to the prescriptions given in the examples.

Example I.

Production of a red dyestuff on woolen yarn from 1-(2':3'-hydroxynaphthoylamino)-3-(4"-toluenesulphamino)-benzene and 4-nitro-2-toluidine, the formula of which is:

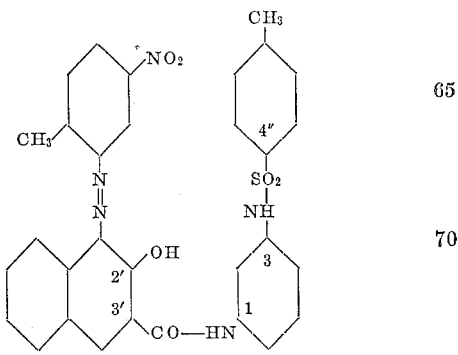

10 kilos of raw or bleached sheep's wool yarn are introduced, dry or wet, into a vat prepared as follows:—

1 kilo of the naphthol is stirred with 0.8 litre of sodium Turkey red oil, sodium ricinoleate or like product, and dissolved by boiling with 1.2 kilos of calcined sodium carbonate. After complete dissolution there are added 10 kilos of Glauber's salt and the whole is made up with warm water to 250 litres.

For the protection of the wool fibre against the injurious action of the alkali, 400 grams of an agent for protecting wool are added, for instance glue, glucose, saponin, a resinous body or a sulphonic acid of a resinous body, a sulphite, sulphite cellulose lye or a similarly acting product.

The high affinity of the wool for the azo-component renders it possible to wash the material thus grounded, which saves the usual centrifuging and considerably enhances the fastness to rubbing. The washing may be done in a weak sodium carbonate solution at 40° C.; the yarn is then drained and introduced into the dye-bath. The latter is prepared as follows:—

0.6 kilo of 4-nitro-2-toluidine are dissolved with 1.2 litre of hydrochloric acid of 20° Bé. in 6 litres of boiling water. After addition of 9 litres of cold water the solution is cooled with ice, and there is allowed to flow in while stirring 0.3 kilos of sodium nitrite dissolved in about 1 litre of water. After long standing, when the diazotization is complete, the bath is neutralized with 0.6 kilo of sodium acetate. To the solution thus obtained there is added a solution of 6 kilos of common salt, and the whole is made up with cold water to 250 litres.

In this developing bath the goods are retained for ½ hour, then washed and soured with a hot solution containing 0.5 to 1 cc. of concentrated sulphuric acid per litre; they are then soaped to improve the fastness to rubbing, and finally washed and dried.

*Example II.*

Production of a yellow azo-dyestuff from 1-(4'-cresotylamino)-3-(4''-toluene sulphamino)-benzene and 2-chloraniline of the formula—

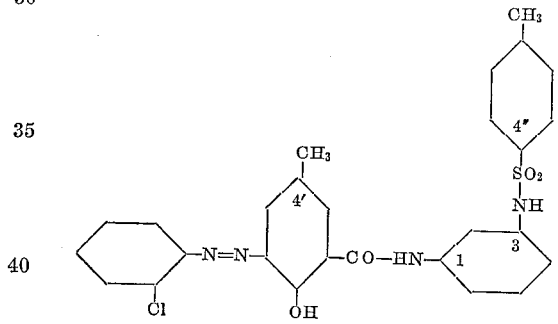

with intervention of a vat-dye stuff, such as indigo:

The grounding for 50 kilos of loose wool or felt is prepared as follows:—

1.6 kilo of 1-(4'-cresotylamino)-3-(4''-toluene-sulphamino)-benzene are stirred with 0.2 kilo of sodium isopropylnaphthalene sulphonate or an analogous wetting agent and 2 litres of water and are then brought into solution by means of 1.6 kilos of calcined sodium carbonate in hot water. When dissolution is complete 16 kilos of Glauber's salt are added.

There is then prepared a stock vat of indigo as follows:

2 kilos of indigo, or 10 kilos of indigo paste of 20 per cent strength, are stirred well with 80 litres of water at 55° C. and 3 kilos of caustic soda lye of 40° Bé. and there are then introduced gradually and while stirring 3 kilos of hydrosulphite conc. plv.

The temperature of the stock vat must be 55° C. The colour is greenish yellow.

Of this stock vat, 16 litres, corresponding with 0.4 kilo of indigo, are introduced into the aforesaid grounding bath. Since the temperature of the dye-bath in the case of indigo is 50° C. the grounding bath must also be kept at this temperature.

The whole grounding bath is made up to 500 litres. The grounded goods are then washed with sodium carbonate, drained, allowed to oxidize in the air and then introduced into the developing bath which is prepared as follows:—

1 kilo of 2-chloraniline-hydrochloride is made into a paste with 5 litres of hot water and 1.2 litres of hydrochloric acid of 20° Bé. The paste is dissolved in 20 litres of water and diazotized with 0.46 kilo of sodium nitrite dissolved in about 2 litres of water, the solution being cooled by ice. Neutralization with sodium acetate follows and the whole is made up with water to 500 litres.

The goods are handled in the developing bath for ½ hour, and then washed, soured, soaped, several times washed and dried.

*Example III.*

Production of a red azo-dyestuff from 1-(1':4' hydroxynaphthoylamino)-3-(4''-toluene-sulphamino)-benzene and 4-aminoazotoluene, the formula of which is:

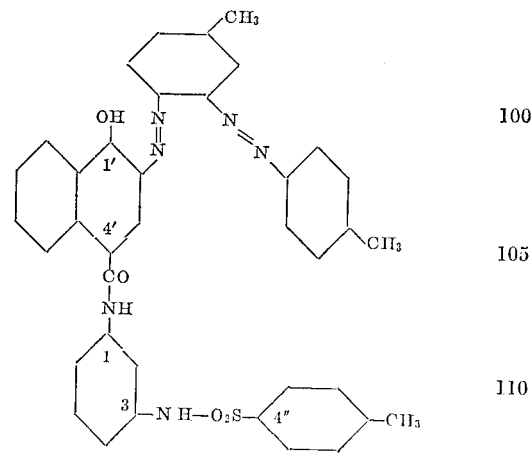

The grounding bath for 50 kilos of woollen piece-goods is prepared as follows:—

2 kilos of 1-(1':4' hydroxynaphthoylamino-3-(4''-toluene-sulphamino)-benzene are stirred well with 1 litre of tetracarnit, and dissolved with aid of 2.5 kilos of calcined sodium carbonate in 10 litres of boiling water, and the whole is made up with water to 500 litres.

After grounding the goods are run into a weak solution of sodium carbonate and then developed for ½ hour in the developing bath made as follows:—

1.5 kilo of 4-aminoazotoluene are made into a paste with 1.73 litres of hydrochloric acid of 20° Bé. The paste is stirred with 22.5 litres of water, cooled with ice, and then diazotized with 0.45 kilo of sodium nitrite. It is advantageous to filter. After this, neutralization with sodium acetate follows and the whole is made up with water to 500 litres.

The usual operations follow.

Example IV.

Production of a yellow brown azo-dyestuff from 1-(2':3'hydroxytetraloylamino)-3-(4''-toluenesulphamino)-benzene and meta-nitraniline, as per formula:

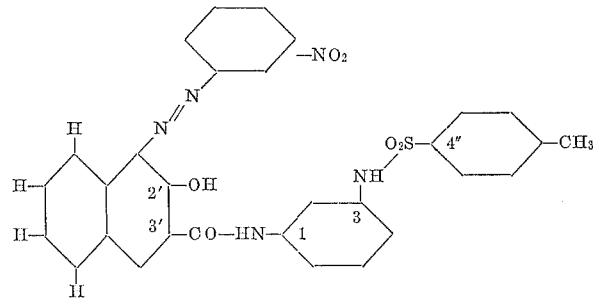

10 kilos of yarn are grounded in a vat prepared as follows:—

1 kilo of 1-2':3'-hydroxytetraloylamino)-3-(4''-toluene-sulphamino)-benzene are made into a paste with 0.8 litre of Turkey red oil, and dissolved by means of 1 kilo of calcined sodium carbonate and boiling water. 10 kilos of Glauber's salt are added and the whole is made up with water to 250 litres.

The yarn is then well centrifuged; in this case washing with sodium carbonate is omitted and the yarn is transferred to the developing bath, which is made as follows:—

0.9 kilos of meta-nitraniline are made into a paste with 1.35 litres of hot water, which is then cooled with ice; there are then added 0.486 kilo of sodium nitrite, 30 litres of ice-cold water and 1.93 litres of hydrochloric acid of 20° Bé. After filtration and neutralization with sodium acetate the whole is made up with water to 500 litres.

The usual treatment follows.

Example V.

Production of a brown azo-dyestuff from 1-(salicoylamino)-4-(4'-toluenesulphamino)-benzene and α-naphthylamine of the formula

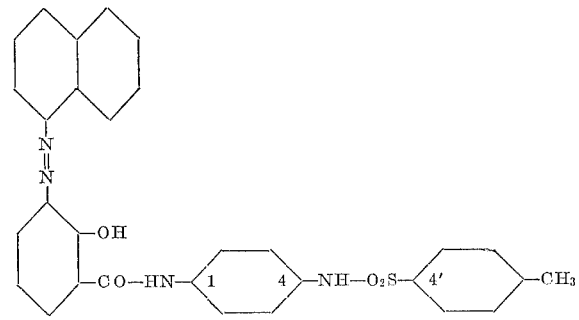

and after-chroming of the dyeing.

The grounding bath for 10 kilos of the goods is made as follows:—

1 kilo of 1-(salicoylamino)-4-(4'-toluene-sulphamino)-benzene is stirred with 0.8 litre of Turkey red oil and then dissolved with aid of 1 kilo of calcined sodium carbonate and boiling water. The solution is mixed with 10 kilos of Glauber's salt and then made up with water to 250 litres.

The goods are then developed in a bath prepared as follows:—

1.5 kilos of α-naphthylamine are dissolved in 2.4 litres of hydrochloric acid of 20° Bé. and 18 litres of hot water; the solution is then cooled with ice, diazotized with 0.675 kilos of sodium nitrite, filtered, neutralized with sodium acetate and made up with water to 500 litres.

The dyed goods, after the usual further treatment, are after-chromed without drying in the following manner:—

There is prepared a solution containing 2 parts by weight of potassium bichromate and 3 parts by weight of acetic acid of 30 per cent strength per 100 parts by weight of the goods and the dyed material is treated in this solution for ½ hour at the boiling point. It is then washed and dried.

The procedure may be such that the wool, according to the depth of dyeing, is first mordanted with 1–4 per cent of its weight of potassium bichromate and 1–3 per cent of its weight of potassium bitartrate in a bath in which it is kept at boiling for 1–2 hours;

it is then washed and grounded. Instead of potassium bitartrate, lactic acid, formic acid or the like may be used.

*Example VI.*

Production of a blue azo-dyestuff from 1-methyl-2-(2':3'-hydroxynaphthoylamino)-4-(sulphanilide)-benzene and dianisidine of the formula

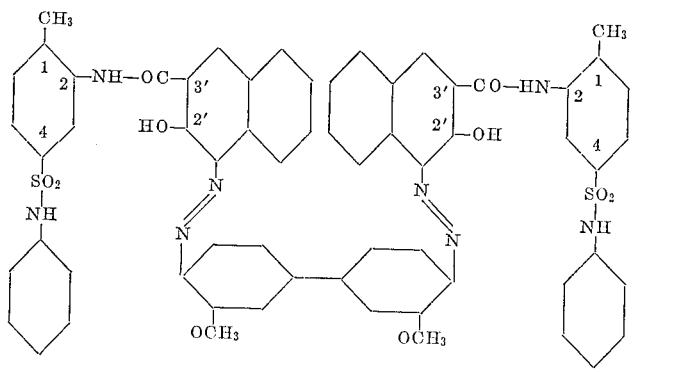

and treatment with copper of the dyeing obtained.

10 kilos of goods are grounded in a bath made as follows—

1 kilo of 1-methyl-2(2':3'-hydroxynaphthoylamino) - 4 - (sulphanilide) - benzene is stirred with 0.8 litre of Turkey red oil; the mixture is dissolved with aid of 1.5 kilos of calcined sodium carbonate in boiling water; 10 kilos of Glauber's salt are added and the whole made up with water to 250 litres.

After the grounding has been continued for ¾ hour at 50° C. the goods are transferred to the usual sodium carbonate washing bath and then developed in a bath prepared as follows:—

1 kilo of dianisidine is stirred with 1 litre of hydrochloric acid of 20° Bé. and dissolved in 1 litre of boiling water; after cooling with ice another 1 litre of hydrochloric acid of 20° Bé. is added and the whole is diazotized with 0.625 kilo of sodium nitrite and then neutralized with sodium acetate and made up with water to 500 litres.

The dyed goods, after the usual further treatment, are treated without drying for ½ hour at the boiling point in a bath composed of 2 grams of crystallized copper sulphate per litre and 2 grams of acetic acid of 30 per cent strength per litre.

*Example VII.*

Production of a bluish-red azo-dyestuff on feathers from 1-methyl-2-(2':3'-hydroxynaphthoylamino)-4-benzene-sulphamide and 1:3:4-xylidine the formula for which is:—

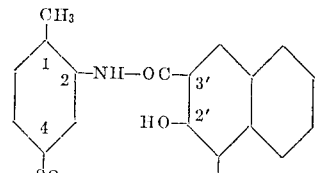

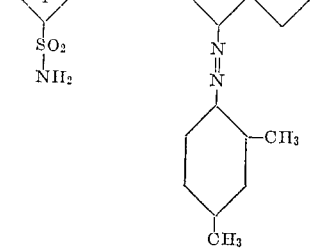

10 kilos of feathers are grounded in a bath prepared as follows:—

1 kilo of the 1-methyl-2-(2':3'-hydroxynaphthoylamino)-4-benzene sulphamide is stirred with 0.8 litre of Turkey red oil and 8.8 litres of ammonia of 25 per cent strength, and then dissolved in boiling water; 10 kilos of Glauber's salt are then added and the whole is made up with water to 250 litres.

For protecting the feathers, 400 grams of glue or glucose are added to the bath; the temperature should be 50° C. and the operation may occupy ¾ hour.

The feathers are then washed in a weak solution of ammonia of 40° C., washed, allowed to drain and developed in a vat prepared as follows:—

1 kilo of 1:3:4-xylidine is stirred with 1.55 litres of hydrochloric acid of 20° Bé., and then dissolved in hot water. After cooling with ice the solution is diazotized with 0.57 kilo of sodium nitrite dissolved in 2 litres of water; it is neutralized with sodium acetate and the whole is made up with water to 500 litres.

Following this bath the feathers are treated in the usual manner.

*Example VIII.*

Production of a yellow azo-dyestuff on hairs of animal origin, such as from dogs, hares, goats, oxen or cats, from tetrahydro-naphthol-2:3-sulphanilide and 2-anisidine, the formula for which is:—

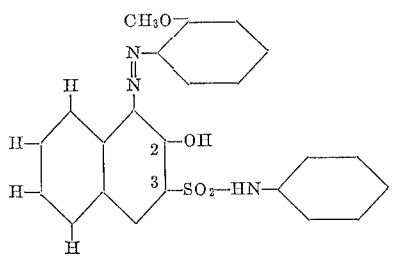

10 kilos of hair bleached as white as possible are handled for ¾ hour in a grounding bath having a temperature of 50–60° C. and prepared as follows:—

1 kilo of tetrahydronaphthol-2:3-sulphanilide are made into a paste with 0.3 litres of Turkey red oil and dissolved in boiling water with the aid of 1.2 kilos of calcined sodium carbonate; there is then added 0.5 litre of a hydrogenized phenol or naphthalene-hydrocarbon, such as hexaline, methylhexaline, decaline, and the whole is well stirred until complete emulsification, whereupon it is made up with water to 300 litres.

The goods are then washed in a bath of Glauber's salt of about 1:100 at 40° C. and then transferred to a developing bath made as follows:—

1 kilo of 2-anisidine is dissolved with aid of heat in 1.53 litres of hydrochloric acid of 20° Bé., and about 10 litres of water; after cooling with ice the solution is diazotized with 0.561 kilo of sodium nitrite, then neutralized with sodium acetate and made up with water to 300 litres.

After development, the goods are treated as usual.

*Example IX.*

Production of an orange azo-dyestuff from 2-naphthol-3:6-[6:8]-disulphanilide and 3-chloraniline hydrochloride with the aid of formaldehyde.

The formula for "3:6" is:

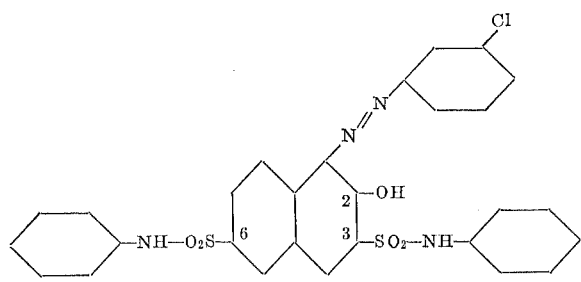

The formula for "(6:8)" is:

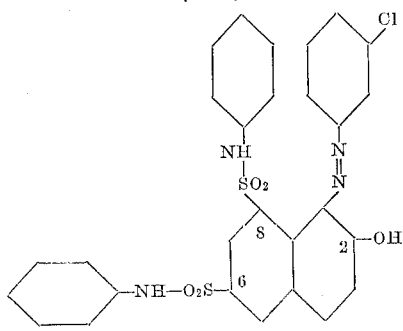

10 kilos of woollen yarn are treated for ¾ hour at 50–60° C. in a grounding bath prepared as follows:—

1 kilo of 2-naphthol-3:6-[6:8]-disulphanilide is made into a paste with 0.8 litre of Turkey red oil and then dissolved in boiling water containing 1.2 kilos of calcined sodium carbonate; to improve the durability of this grounding vat there is added 0.5 litre of formaldehyde of 30 per cent strength; 10 kilos of Glauber's salt are added and water to make up to 350 litres.

The goods are then washed in a weak sodium carbonate bath at 40° C. and developed in a bath prepared as follows:—

1 kilo of 3-chloraniline hydrochloride is stirred with 5 litres of hot water and dissolved in 1.2 litres of hydrochloric acid of 20° Bé.

The solution is cooled by adding 15 litres of ice-cold water and diazotized with 0.46 kilos of sodium nitrite dissolved in 2 litres of water; after neutralization with sodium acetate the whole is made up with water to 350 litres.

The goods are then treated as usual.

*Example X.*

Production of a brown azo-dyestuff on chrome leather, from 2-naphthol-6-sulphanilide and 2:5-dichloraniline, the formula for which is:—

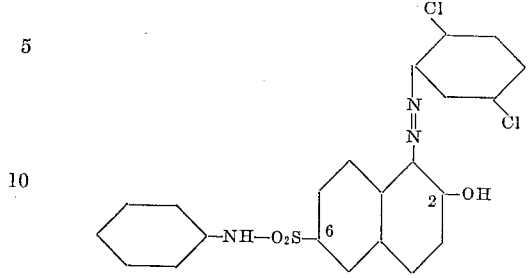

For the purpose of producing uniform dyeings the thoroughly neutralized chrome leather is softened in a bath containing about 1–2 cc. of Turkey red oil per litre. It is then dyed by treatment in a fulling cask for 1–2 hours at a temperature of 60° C. The grounding is prepared as follows:—

1 kilo of 2-naphthol-6-sulphanilide is well stirred with 0.8 litre of Turkey red oil and dissolved in hot water containing 1.2 kilos of calcined sodium carbonate; 20 kilos of Glauber's salt are added and the whole is made up with water to 200 litres.

The leather thus grounded is washed for a short time in a weak sodium carbonate bath at 60° C. and then transferred to the developing vat which is made as follows:—

1.25 kilos of dichloraniline is stirred with 1.14 litres of hydrochloric acid of 20° Bé, dissolved in 10 litres of hot water, cooled with ice and diazotized with 0.418 kilo of sodium nitrite dissolved in 2 litres of water; after neutralization with sodium acetate the whole is made up with water to 500 litres.

After development, the leather is treated in a bath containing 1–2 cc. of acetic acid of 30 per cent strength per litre at 60° C., and for the purpose of enhancing fastness to rubbing is subsequently treated with an emulsion of Turkey red oil and chloroform in water.

Example XI.

Production of a yellow brown azo-dyestuff from 4-toluene sulpho-1′-naphthylamide and 5-nitro-2-toluidine, the formula for which is:

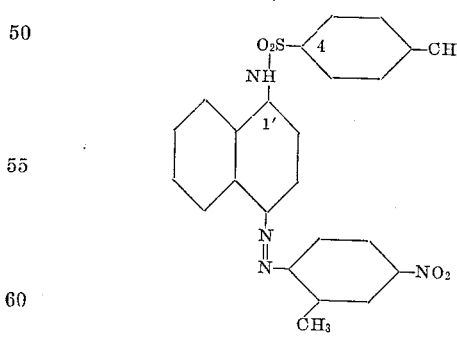

10 kilos of goods are grounded in a bath prepared as follows:—

1 kilo of 4-toluenesulpho-1′-naphthylamide is made into a paste with 0.15 litre of caustic soda lye of 40° Bé. and boiled with 30 litres of water; 0.5 kilo of the preparation made from sulphite cellulose waste liquor and known to protect wool from attack by strongly alkaline solutions (known commercially as Protectol Agfa) is added together with 10 kilos of Glauber's salt, and the whole is made up with water to 250 litres.

The goods are then washed in a weak sodium carbonate bath of 40° C. and developed in a vat made as follows:—

1 kilo of 5-nitro-2-toluidine is stirred with 2 litres of hot water and 0.5 kilo of sodium nitrite is added; this mixture is cooled by addition of cold water and ice and to it are added 2 litres of hydrochloric acid of 20° Bé. After filtration and neutralization with sodium acetate the whole is made up with water to 250 litres.

The subsequent treatment is as usual.

Example XII.

Production of a red brown azo-dyestuff on natural silk of various kinds and variously treated (unweighted silk, weighted silk, tussore silk, chappe-silk) from 1-amino-3-(4′-toluenesulphamino)-benzene and para-nitraniline, the formula for which is:

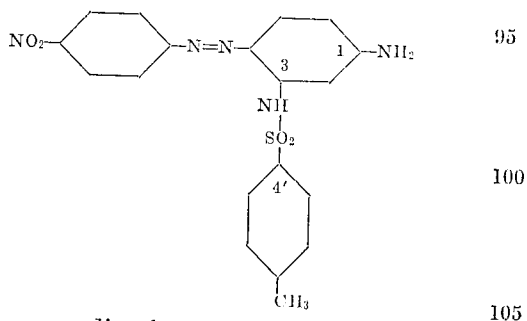

The grounding bath calculated for 10 kilos of goods is prepared as follows:—

1 kilo of 1-amino-3-(4′-toluenesulphamino)-benzene is stirred well with 1 kilo of calcined sodium carbonate and 0.8 litre of Turkey red oil; 400 grams of the sulphite cellulose liquor preparation referred to in Example XI are added, the whole dissolved in hot water and, with addition of 10 kilos of Glauber's salt, made up with water to 300 litres.

The goods are then washed for a short time in a weak sodium carbonate bath with addition of some of the aforesaid preparation from sulphite cellulose liquor and developed in a vat prepared as follows:—

0.5 kilo of para-nitraniline is boiled with 3 litres of hot water and 0.93 litre of hydrochloric acid is added while constantly stirring until a clear solution is produced; this solution is stirred into one of 5 litres of cold water, 0.93 litres of hydrochloric acid of 20° Bé.

and 5 kilos of ice; a solution of 0.23 kilos of sodium nitrite in 1 litre of water is added and the whole is neutralized with sodium acetate and made up with water to 220 litres.

The usual treatment follows.

For grounding about 10 kilos of the goods the following bath is prepared, the temperature of the grounding being 40° C.—

1 kilo of 1'-(1:5-dihydroxynaphthalene-2-azo)-2'-methyl-5'-sulphaminobenzene is made into a paste with 0.8 litre of Turkey red oil and 0.5 kilo of calcined sodium carbonate, and boiled with hot water and 4 litres of ammonia of 25 per cent strength; 1 kilo of the sulphite cellulose liquor preparation referred to in Example XI and 10 kilos of Glauber's salt are added and the whole is made up with water to 500 litres.

There follows a short washing in a bath containing some sodium carbonate and Protectol and then development in a bath made as follows:—

1 kilo of 4-anisidine is stirred with 1.53 litres of hydrochloric acid of 20° Bé. dissolved in hot water and then cooled with ice; the solution is diazotized with 0.561 kilo of sodium nitrite, dissolved in 2 litres of water and then neutralized with sodium acetate and made up with water to 500 litres.

The goods are then washed in a weak acetate acid bath at 40° C. and further washed with pure water and finished.

Example XIV.

Production of a yellow azo-dyestuff, fast to washing and fulling, on wool from 1-(2'-methyl-5'-sulphamino)-phenyl-3-methyl-5-pyrazolone of the formula—

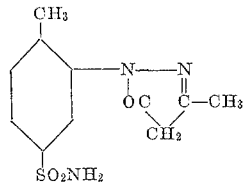

and 2-chloroniline.

1.00 kilo of 1-(2'-methyl-5'-sulphamino)-phenyl-3-methyl-5-pyrazolone is made into a paste with 1.80 litres of soda Turkey red oil and dissolved in boiling water with aid of 1.25 kilos of calcinett sodium carbonate; to this liquor are added 400.00 grams of glucose,

Example XIII.

Production on pelts of a brown azo-dyestuff from 1'-(1:5-dihydroxynaphthalene-2-azo)-2'-methyl-5'-sulphaminobenzene and 4-anisidine, and the formula for which is:

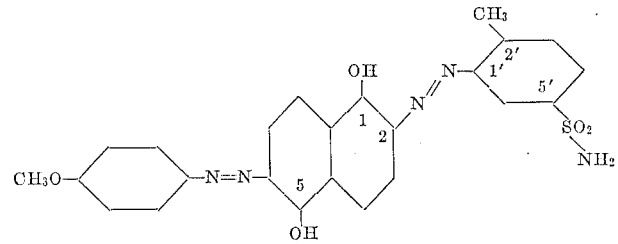

to protect the wool fibre, and 10.00 kilos of Glauber's salt. The whole is made up with water to 250.00 litres.

The goods are well handled in this grounding liquor for ¾ hour at 50–60° C., then wrung out and washed in a bath containing about 5–10 grams of Glauber's salt per litre.

The dyestuff is then developed in a bath prepared as follows:

1.00 kilo of 2-chloraniline hydrochloride is made into a paste with 5.00 litres of hot water and 1.20 litres of hydrochloric acid of 20° Bé., and dissolved in 20.00 litres of water; the solution is cooled with ice and diazotized with 0.46 kilo of sodium nitrite dissolved in 2.00 litres of water. Neutralization with sodium acetate follows and the whole is made up with water to 500.00 litres.

The goods are handled in this developing bath for half-an-hour, then washed, soured, soaped if necessary, again washed and dried.

Like yellow tints are obtained when there is used, instead of 2-chloraniline, 4-chloraniline, 4-chloro-2-toluidine or 2:5-dichloraniline.

In this specification and in the claims appended thereto the term "aromatic radicle" includes a substituted aromatic radicle and also the radicle of any member of a homologous series of aromatic radicles.

Having thus fully described the nature of our said invention and the best means we know for carrying the same into practical effect, we claim:—

1. A process of producing azo-dyestuffs on animal materials which process consists in grounding the material with an aromatic organic compound containing the group —SO₂.NH— and capable of coupling with a diazo-compound to form a dyestuff, and then developing the grounding by means of such diazo-compound.

2. A process of producing azo-dyestuffs on animal materials which process consists in grounding the material with an aromatic organic compound having the general formula R—SO₂.NHR', in which R is an aromatic radicle and R' is an aromatic radicle or hydrogen, the said compound being capable of coupling with a diazo-compound to form a dyestuff, and then developing the grounding by means of such diazo-compound.

3. A process of producing azo-dyestuffs on animal materials which process consists in grounding the material with an aromatic organic compound having the general formula R—SO$_2$.NH—R'—NH.COR'', in which R, R' and R'' are aromatic radicles, the said compound being capable of coupling with a diazo-compound, and then developing the grounding by means of such diazo-compound.

4. A process of producing azo-dyestuffs on animal materials which process consists in grounding the material in presence of formaldehyde with an aromatic organic compound containing the group —SO$_2$.NH— and capable of coupling with a diazo-compound to form a dyestuff, and then developing the grounding by means of such diazo-compound.

5. A process of producing azo-dyestuffs on animal materials which process consists in grounding the material in presence of formaldehyde with an aromatic organic compound having the general formula

R—SO$_2$.NHR', in which R is an aromatic radicle and R' is an aromatic radicle or hydrogen, the said compound being capable of coupling with a diazo-compound to form a dyestuff, and then developing the grounding by means of such diazo-compound.

6. A process of producing azo-dyestuffs on animal materials which process consists in grounding the material in presence of formaldehyde with an aromatic organic compound having the general formula

R—SO$_2$.NH—R'—NH.COR'', in which R, R' and R'' are aromatic radicles, the said compound being capable of coupling with a diazo-compound, and then developing the grounding by means of such diazo-compound.

7. As a new article of manufacture an animal material having adsorbed in its surface an azo-dyestuff composed of an aromatic organic compound containing the group —SO$_2$.NH— coupled with a diazo-compound.

8. As a new article of manufacture an animal material having adsorbed in its surface an azo-dyestuff composed of an aromatic organic compound of the general formula R—SO$_2$.NHR', in which R is an aromatic radicle and R' an aromatic radicle or hydrogen, coupled with a diazo-compound.

9. As a new article of manufacture an animal material having adsorbed in its surface an azo-dyestuff composed of an aromatic organic compound of the general formula R—SO$_2$.NH—R'—NH.COR'', in which R, R' and R'' are aromatic radicles, coupled with a diazo-compound.

In testimony whereof we have signed our names to this specification.

ERWIN SCHWENK.
KARL REICHNER.
METHODIUS KNOB.